H. B. KILLEFER & W. J. BOYD.
FAUCET.
APPLICATION FILED JAN. 28, 1913.
1,159,685.
Patented Nov. 9, 1915.
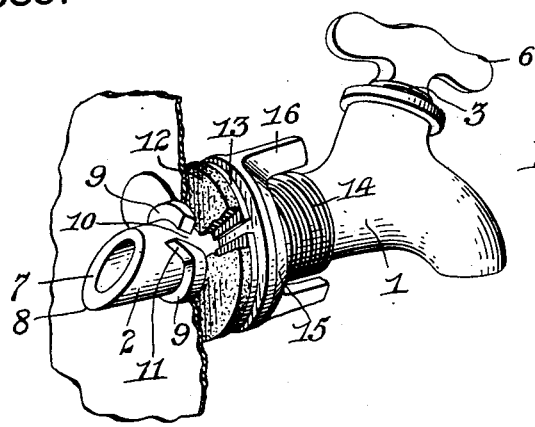
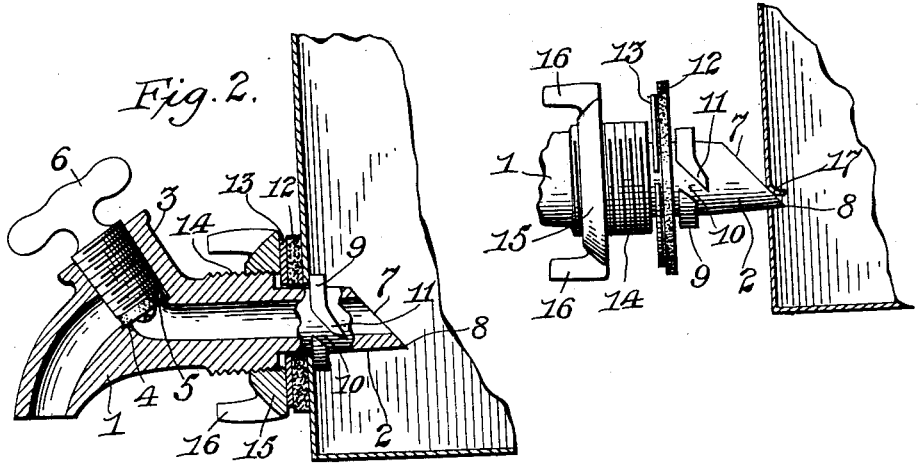
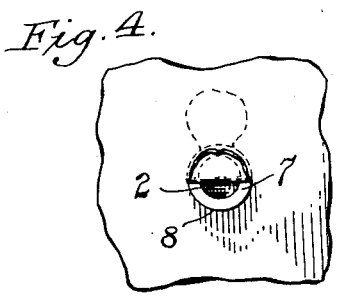
Witnesses
Bertha E. Niemeyer
J. H. Bradley
Inventors
Henry B. Killefer,
and William J. Boyd.
By Cassell Severance
Attorney.

UNITED STATES PATENT OFFICE.

HENRY B. KILLEFER AND WILLIAM J. BOYD, OF LOS ANGELES, CALIFORNIA.

FAUCET.

1,159,685.  Specification of Letters Patent.  Patented Nov. 9, 1915.

Application filed January 28, 1913. Serial No. 744,653.

*To all whom it may concern:*

Be it known that we, HENRY B. KILLEFER and WILLIAM J. BOYD, citizens of the United States, residing at Los Angeles, in the county of Los Angeles and State of California, have invented certain new and useful Improvements in Faucets, of which the following is a specification.

This invention relates to improvements in faucets and particularly to faucets that are capable of being secured to the walls of a receptacle with a quick removable joint, and yet with such a fastening to said walls as to make a non-leakable joint.

It is an object of the invention to provide a faucet with a coupling having a penetrating cutting point adapted to be forced through the walls of a thin metal or similar receptacle.

It is also an object of the invention to provide a faucet or coupling having its stem provided with a tapered cutting edge, adapted to penetrate the walls of a receptacle without obstructing the outlet opening through the stem, the said stem also being provided with a shouldering means adapted to be carried behind the walls of the receptacle to which the faucet or coupling is to be attached, clamping means being also provided exteriorly of said wall to draw the parts tightly in place.

In the accompanying drawing, forming part of this specification, Figure 1 is a perspective view of a faucet constructed in accordance with this invention, the adjacent parts of the wall of a receptacle being shown in position, and partly broken away. Fig. 2 is a vertical, central, sectional view taken longitudinally through the faucet, the said faucet being shown as clamped in position in an opening formed in the walls of a can or receptacle. Fig. 3 is a detail view showing the penetrating end of the faucet and the clamping means thereon, said penetrating end being partially forced through the walls of a metallic can or receptacle. Fig. 4 is a fragmentary detail view of a portion of a can wall, showing in end elevation the penetrating point of the faucet pushed partially through the said wall.

The faucet or coupling forming the subject matter of the present invention is designed to be capable of quick attachment to a thin walled receptacle, such for instance as an ordinary tin or sheet iron can, and also to be capable of quick and ready removal therefrom when it is desired to employ the same upon another can. The details and features of the invention will now be more particularly described, reference being had to the drawing, in which 1 indicates the body portion of a faucet, 2 a penetrating end formed thereon, and 3 a plug adapted to control the flow of materials through said faucet. The body portion of the faucet 1 is made hollow, as clearly shown in Fig. 2 and is provided with a valve or plug seat 4 adapted to be engaged by the inner end of the plug 3, for controling the flow of materials through said faucet. The plug 3 is merely a screw threaded plug having a washer 5 attached thereto, and adapted to engage the seat 4, said plug being also provided with any usual or suitable handle 6. The inner end of the faucet is preferably beveled or formed with an inclined end portion at 7 whereby the penetrating end 2 is provided with a sharp penetrating or cutting edge 8, which may be readily thrust through the thin walls of a tin or other metallic receptacle. By beveling the penetrating end of the faucet, the cutting edge is carried to one side of the bore of the faucet so that the flow of liquids or other material through said faucet is not interrupted or impeded in any way. The said penetrating end portion 2 is preferably slightly tapered toward the cutting edge 8 upon its peripheral surface. The stem of the faucet is also provided with a retaining shoulder means adapted to engage the inner surface of the receptacle, and as shown in Figs. 1, 2, and 3, said retaining shoulder portion may be made in the form of a flange 9 extending almost entirely around the faucet stem but having a break formed therein at 10, and one end turned inwardly at 11. The inturned end 11 is preferably made sharp so as to readily enter the opening in the can wall when the faucet is turned within the same. By pressing the faucet inwardly, and turning it so as to cause said point 11 to force its way to the inside of the can, the shouldering flange 9 may be entirely carried within the wall of the said receptacle. Outside the receptacle wall, the stem of the faucet carries a yielding of flexible washer 12 which is adapted to be forced against the outer surface of the receptacle wall to seal the joint between the faucet and the opening formed in said wall.

In order to more perfectly carry the washer or gasket 12 inwardly, a metallic washer 13 is also placed upon the stem of the faucet, having a central opening just fitting the same, so that the said washer 13 will be capable of forcing the gasket 12 evenly against the wall of the receptacle and at points immediately surrounding the faucet stem as well as those portions of the gasket near its outer periphery. Just outside the gasket and washer, the stem of the faucet is formed with an enlarged screw threaded portion 14, carrying a thumb nut 15, which may be turned against the said washer and gasket for forcing them tightly into contact with the walls of the receptacle. The said thumb nut 15 is provided with thumb and finger engaging projections 16, by which it may be readily turned into and out of position in clamping the parts together.

As shown in Fig. 3, the cutting point of the faucet, as it is forced through the thin walls of the can or receptacle, tends to cut and curl inwardly the material of the receptacle wall as at 17. This material is finally folded almost flat against the inner surface of the wall, and is gripped between the parts as shown in Fig. 1, so that there is no chance for leakage due to any unevenness in the aperture made by forcing the end of the faucet through the wall.

In applying the faucet to a can, the sharp penetrating point 8 is pressed against the material of the can wall, and by slightly rocking the same, will be found to readily produce a sheer cut in penetrating the said wall. After the tapered portion of the stem 2 has been forced through the wall, the faucet is given the proper turn to carry the shouldered parts behind the material of the wall, the gasket and washer being left in loose position during the operation. After the parts are placed for final securing, the thumb nut 15 is screwed up tightly against the washer 13, the said washer carrying the gasket 12 firmly about the joint formed with the opening in the receptacle wall. The washer 13 is usually of the split type to facilitate its being put in position behind the flange 9 when assembling the parts of the faucet.

It will be evident that other forms of penetrating points may be employed, so long as they do not obstruct the passage of materials through the faucet, without departing from the spirit of the invention.

It will also be observed that other parts of the faucet may be varied, or mechanical equivalents therefor be employed within the scope of the said invention.

The faucet is quickly removed by loosening the thumb nut and turning the stem in reverse direction as it is pulled out of the hole in the receptacle. The faucet may then be used in another can or receptacle.

What is claimed is:

1. A detachable faucet having a tubular stem cut obliquely at the end to form a receptacle wall penetrating point, a ring formed upon said stem having its wall engaging face parallel with the inner surface of the receptacle, said ring being interrupted at one point and having an auxiliary wedge shaped penetrating point to one side of said interrupted point in the ring, adapted to enlarge the opening made by the stem in the receptacle wall, sufficiently to admit the said ring, and a clamping nut for forcing the receptacle wall against said ring.

2. A faucet having a tubular stem cut obliquely at the end for forming a point capable of penetrating the walls of a receptacle, an annular ring projection formed integral with said stem and cut away at one point for forming an opening therein, an oblique auxiliary penetrating point of the same height as the said annular projection, extending approximately parallel with the oblique end of the stem, whereby the opening in the receptacle wall may be sufficiently enlarged to receive the said annular projection, the cut away portion of the annular projection also admitting metallic washers to the stem back of the said projection, a split metallic washer on said stem behind the annular projection, and a clamping nut having an opening therein of greater diameter than that of the annular projection whereby it may be slipped in position upon the stem and adapted to clamp the washer and receptacle wall against the said annular projection.

In testimony whereof, we have hereunto set our hands, in presence of two witnesses.

HENRY B. KILLEFER.
WILLIAM J. BOYD.

Witnesses:
E. L. WILLIAMS,
CASSELL SEVERANCE.